Oct. 20, 1970 ED R. LUOMA 3,534,533
SPRAYING UNIT FOR LAWN MOWERS OR THE LIKE
Filed Sept. 28, 1967 5 Sheets-Sheet 2

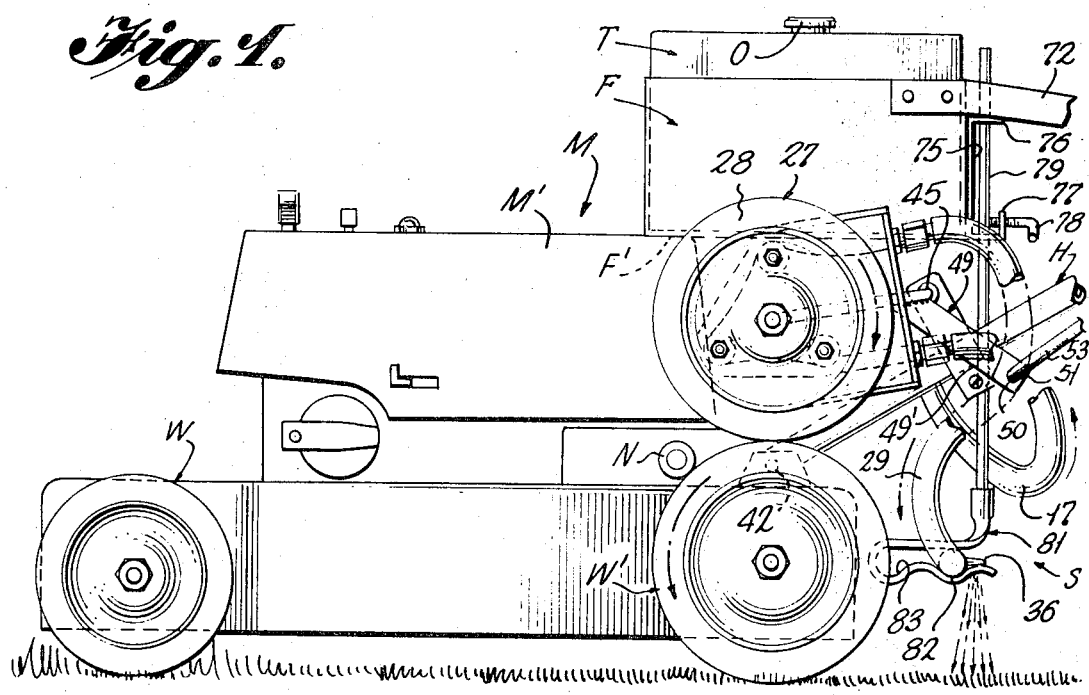
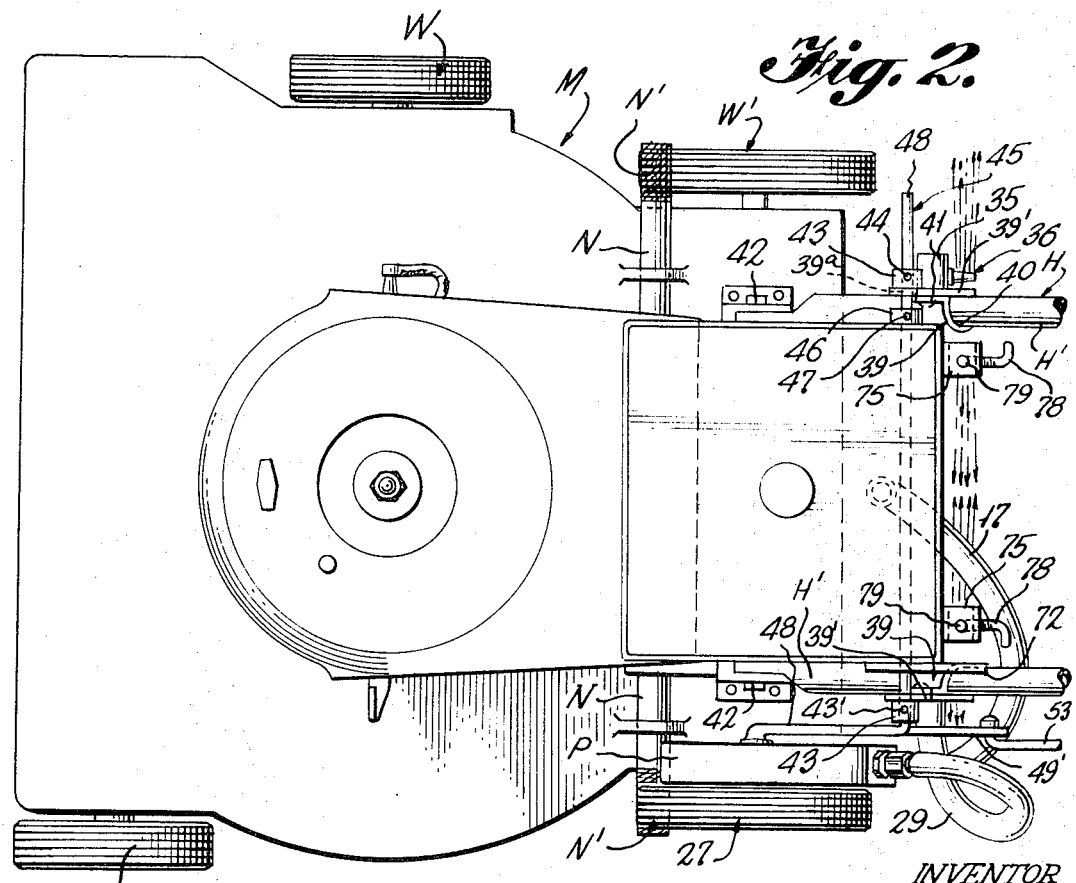

INVENTOR
Ed R. Luoma
BY Shoemaker and Mattare
ATTORNEYS

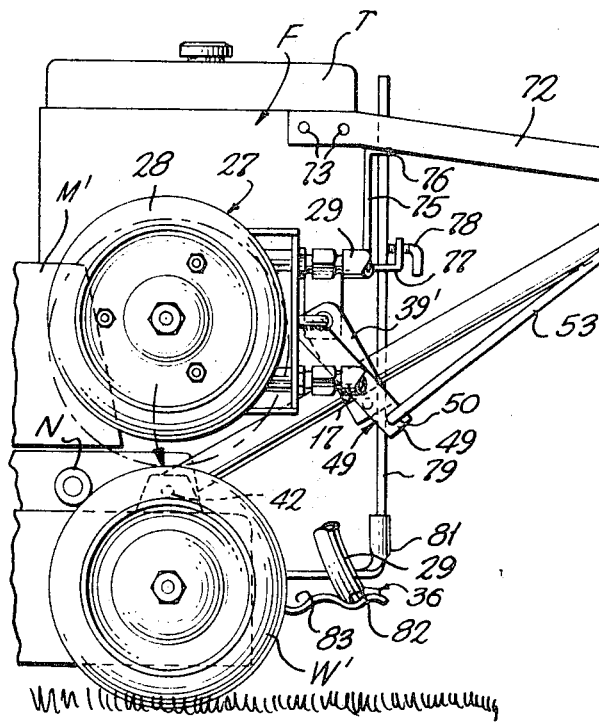
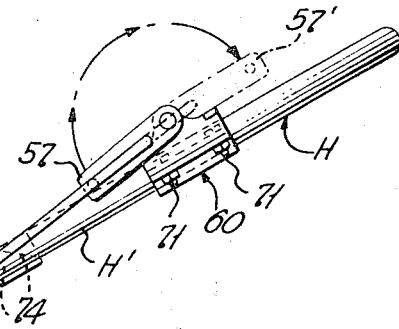
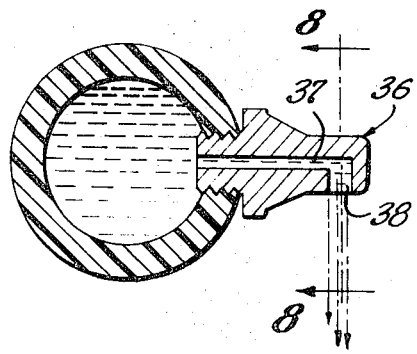
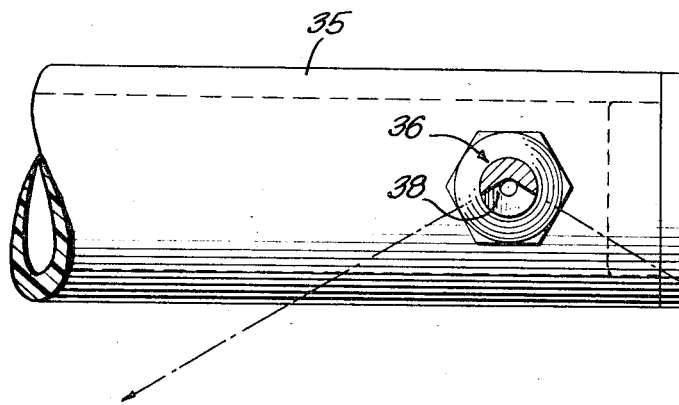
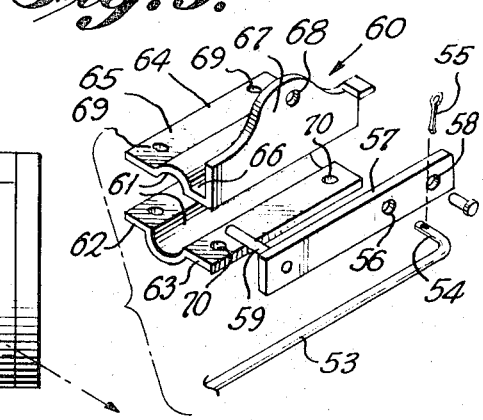

Oct. 20, 1970 ED R. LUOMA 3,534,533
SPRAYING UNIT FOR LAWN MOWERS OR THE LIKE
Filed Sept. 28, 1967 5 Sheets-Sheet 4

INVENTOR
Ed R. Luoma
BY Shoemaker and Mattare
ATTORNEYS

Oct. 20, 1970 ED R. LUOMA 3,534,533
SPRAYING UNIT FOR LAWN MOWERS OR THE LIKE
Filed Sept. 28, 1967 5 Sheets-Sheet 5

INVENTOR
Ed R. Luoma
BY Shoemaker and Mattare
ATTORNEYS

United States Patent Office 3,534,533
Patented Oct. 20, 1970

3,534,533
SPRAYING UNIT FOR LAWN MOWERS
OR THE LIKE
Ed R. Luoma, 301 Margaret Circle,
Wayzata, Minn. 55391
Filed Sept. 28, 1967, Ser. No. 671,247
Int. Cl. A01d 35/26
U.S. Cl. 56—25.4                           13 Claims

ABSTRACT OF THE DISCLOSURE

The aforesaid types of lawn mowers include means for containing a supply of fluid fertilizer, insecticides, and the like, and this container is connected with a unique type of pump which supplies the fertilizer, insecticides or the like to a spray bar spaced rearwardly from the rear wheels of the mower and above the surface, and having nozzles thereon through which the fertilizer or the like is ejected, and further includes novel means including a wheel or the like that is engageable with a driven ground engaging wheel or other powered moving part of the mower and which first mentioned wheel also operates the pump means which may be of the pulsating type to effect the discharge of the insecticide or the like from a spray bar or the like.

Additionally, there is provided adjustable means whereby the spray bar may be moved closer or farther away from the rear wheels of the mower, said spray bar being also adjustable vertically with regard to the surface that is to have applied thereto the fertilizer, insecticide or the like.

In the self-propelled or pushed type of mower, that mower may be driven by an internal combustion engine or by an electric motor, and there is a take-off drive from the motor which has means that rotatably engage at least one wheel, preferably a rear wheel, of the mower to self-propel the same. Whereas in the riding tractor type mower, there is, of course, a motor, usually an internal combustion engine motor which propels the tractor, and in this modification of the invention, there is a rotatable wheel connected with the pump and which operates the pump, and this wheel is adapted to be moved by certain linkage so as to engage a wheel of the tractor and thus it is rotated and operates the pump.

This invention relates to an improved spraying unit for either the self-propelled or pushed walking guided mowers, or the riding tractor type lawn mowers, or both, and may be in the form of an attachment to existing mowers, or may be built into such mowers at the time the same are manufactured.

Prior art sprayers

In the prior art sprayers, one of the difficulties that has been encountered is to effectively pump the insecticide, fertilizer or whatever it may be to a spray bar or the like, and through nozzles thereon so as to fan out the spray and cover at least an area coinciding with the over-all width of the mower and embody such other features as to effectively prevent the mass production and sale and distribution of sprayer attachments for either the self-propelled or push walking type mowers and/or the riding type mowers. In the prior art devices, the spray of the fertilizer or insecticide has been such as to result in considerable fly away of the material sprayed and where the spray was beneath the hood containing the rotatable blades, it had a deleterious effect on the blades and where the spray was exterior of the hood containing the blades, the fly away would be injurious to the individual either pushing or guiding the self-propelled hand type mower or the riding type mower.

The advantages of the present invention are that there is provided a novel type of pump means for pumping fluid under pressure to the spray bar and discharging it in large fan-like formations such that at least the majority of the sprayed material will be applied to the grass or other surface, and also the spray bar being in the rear of each type of mower mentioned herein, the fly away, if there is any, will not actually affect the user of the mower. Moreover, the pumping arrangement of the present invention results in a low pressure spray further decreasing the amount of fly-away and the fluid to be sprayed is pumped at a rate dependent on the velocity of the mower to which the spraying unit is attached thus insuring proper application of the material being srayed.

The present attachment for the different types of mowers mentioned herein is indeed commercially practicable, having been made and tested and is readily attached to any and all types of existing self-propelled and hand pushed and riding mowers, or this attachment, of course, may, if desired, be built into the different types of mowers by the manufacturer of such mowers and become a permanent part thereof or removable, if desired, by a person at a later date. The over-all weight of the spraying attachment does not impede the efficiency of operation of simultaneously cutting the grass and fertilizing or spraying insecticide or some other material that may be desired. It is to be understood that the attachment is for conventional known lawn mowers, such as "Toro," "Jacobson," "Lawn Boy," etc.

It is, therefore, an object of the present invention to provide a unique spraying mechanism for lawn mowers that may be attached to already existing lawn mowers or built into such lawn mowers at the time of manufacture of the same, and these mowers embodying a unique pumping means connected with a receptacle supplying to the pump a suitable insecticide, fertilizer or the like, and this pumping means being operated by a take off of power supplied by the mower power.

Another object of the invention is to provide a unique pumping means for supplying a fluid from a container to a spray bar, and said pumping means consisting of a depressible unique hollow tubing into which the material to be sprayed is forced, and this tubing being intermittently engaged by means to compress the same and thus pump the material to be sprayed from the container to the spray bar in sufficient pressure so that, by means of nozzles on the spray bar, the fluid will be ejected in a fan-like formation and cover a relatively large area of ground while either simultaneously cutting the grass or just spraying the lawn or other surface as may be desired.

Another object of the invention is to provide a unique height and lateral adjustment of a spray bar for lawn mowers, which spray bar is mounted in spaced relation adjacent the rear wheels of the mower and the spraying is effected so as to substantially prevent fly away of the sprayed material.

Another object of the invention is to provide a unique linkage and control therefor whereby a wheel associated with the pumping means for fluid received from a tank to said pump is moved into engagement with a driven wheel of the mower and thus operates the pump, preferably a pulsating pump, or, stated another way, to intermittently engage the pump, which is a hollow tubular means containing the fluid to effect a pulsating discharge of the fluid therefrom to the spray bar and through nozzles carried thereon.

In respect to the modification of the invention as an attachment or to be built in for the riding tractor type of mower, it is an object of the invention to provide a unique linkage system which is hand controlled and there being a handle, and this handle, being connected to a link, when moved effects movement of a unique pump means carrying a wheel, which said wheel engages the rear tire of the tractor and rotates the same and thus operates the pump means to supply the fluid to a spray bar and out through nozzles in a fan shaped discharge.

These and other objects of this invention are more clearly depicted in the following detailed description having specific reference to the attached drawings in which the embodiments of the invention are shown, not to limit the scope of the invention in any respect but so that the principles thereof might be more clearly demonstrated.

In the drawings:

FIG. 1 is a partial side elevational view of a self-propelled or pushed type of lawn mower with the spray attachment on the mower;

FIG. 2 is a top plan view of the mower of FIG. 1;

FIG. 6 is a partial view of the mower shown in FIG. 1, and including the handle structure and the rod and link means for moving the wheel and pump structure shown in FIG. 5 into engagement with a rear driven wheel of the mower;

FIG. 7 is a detailed cross-sectional view of the spray bar and the discharge nozzle for the fluid;

FIG. 8 is a plan view of the spray bar and a detail of the spray nozzle, taken along the lines 8—8 of FIG. 7;

FIG. 9 is an exploded view of the clamping means and operating handle for the movement of the wheel and pump into engagement with a driven wheel of the mower;

DESCRIPTION OF THE PREFERRED EMBODIMENT

Figure 3:
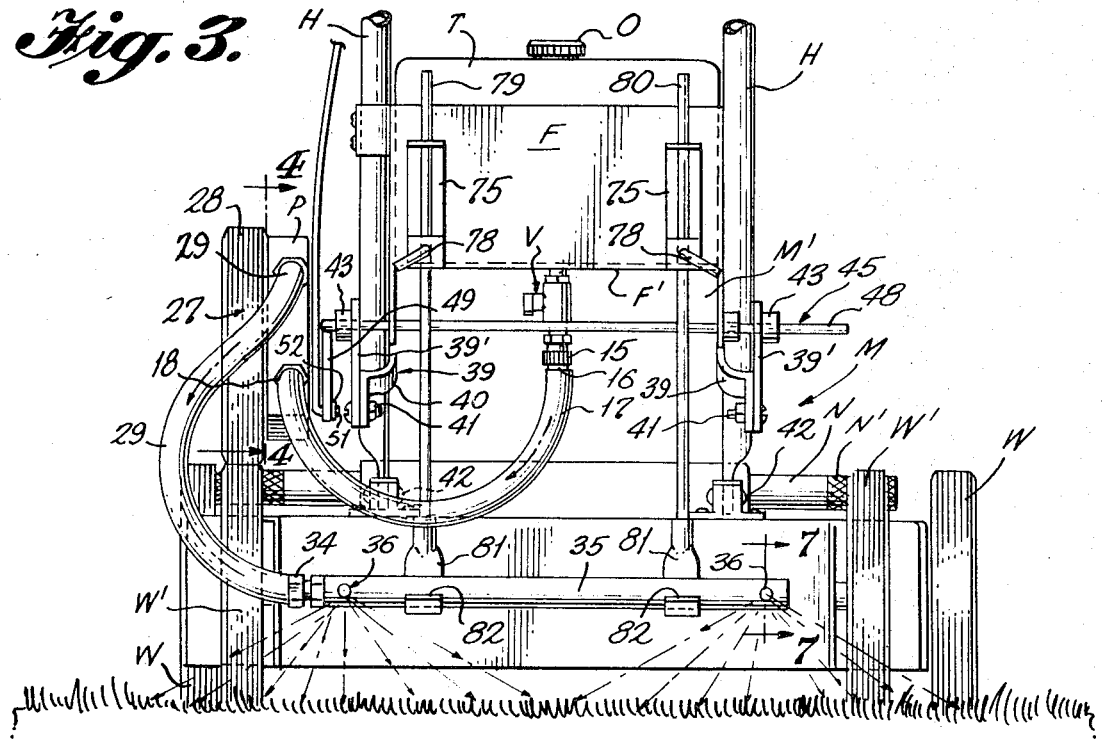
FIG. 3 is a rear elevational view showing the spray bar attachment.
Figure 4:
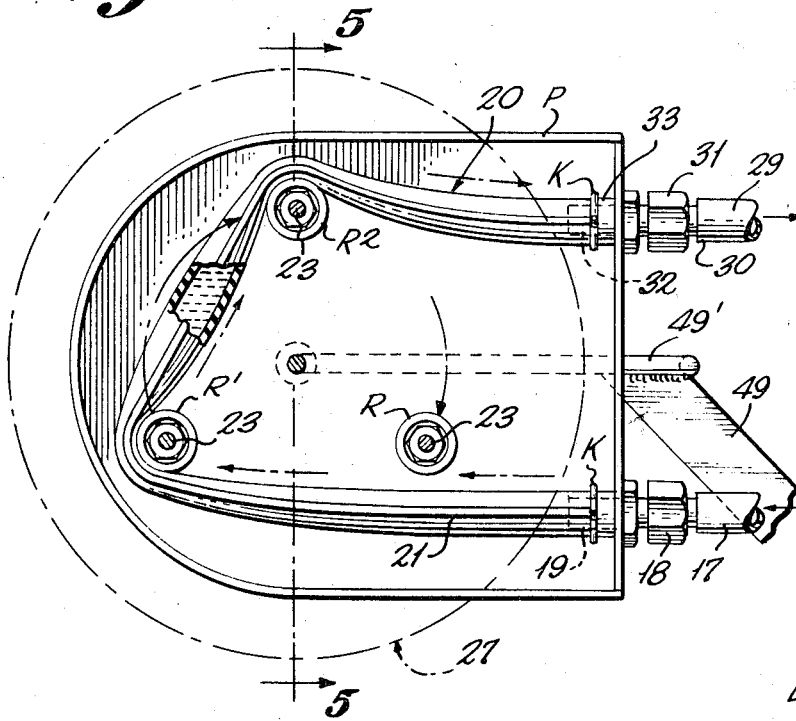
FIG. 4 is a view taken along the lines 4—4 of FIG. 3, showing the details of the unique pump means.
Figure 5:
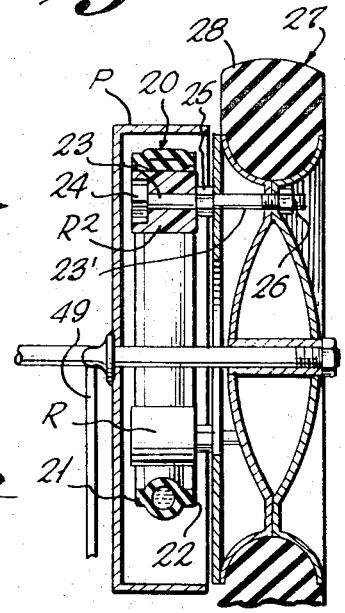
FIG. 5 is a sectional view along the lines 5—5 looking in the direction of the arrows of FIG. 4.

The first form of the invention is depicted in FIGS. 1 through 9, both inclusive.

In FIG. 1, there is a conventional type of self-propelled lawn mower denoted generally at M. The mower M may be driven by an internal combustion engine or an electric motor or in any other way, and includes the usual spark plugs, exterior starter mechanisms, and if not electric, a gasoline tank and, of course, front and rear wheels W and W' respectively, and handle means H which is preferably U-shaped, and most of these components of the mower are not shown as they are conventional.

There are oppositely disposed similar stub shafts N which have their end portions preferably knurled as at N', which said stub shafts are driven by the motor of the mower in the usual way, and the knurled portions thereof are each in engagement with each mower rear wheel W', thus making the mower self-propelled.

The spraying means which, as aforesaid, may either be applied to any existing type of conventional lawn mower, both self-propelled and hand pushed or the riding type mower, is generally indicated at S and includes the fluid or liquid containing tank T, with a closable cap O. A tank frame F, which said frame includes front, side and rear walls and which tank has a front bottom portion thereof F', rests on the motor casing M' of the mower as seen in FIGS. 1 and 6. There is a valve means V and connected with the valve means there is a coupling 15 to which is attached at one end 16 a flexible inlet hose 17 which is connected at its other end by a coupling 18 to the inlet of pump P. Inside of the pump casing, there is a nipple 19 to which is attached the end of the flexible, preferably pulsating type, pump 20. This pump 20 is actually a rubber or plastic tube which, as will be seen from FIG. 5 in its non-compressed condition, has a substantially circular central portion with a passageway completely therethrough, and there are opposite similar laterally extending ribs 21 and 22. When this pump 20 is in its non-compressed condition as seen at the bottom of the view, FIG. 5, the central portion thereof, of course, is filled with the fluid to be discharged, but when compressed as seen in the upper portion, the pump has actually been compressed and the fluid ejected around in the tubing by means of preferably triangularly arranged rollers, R, $R^1$ and $R^2$, which are rotatably mounted within the pump casing P each about a shaft 23, and each roller is maintained in place on the shaft by a headed bolt 24 that is maintained in place by a lock nut 25, and there being an extension 23' of the shaft 23 terminating in an exteriorly screw threaded portion 26, and this extended portion extending through suitable openings, not shown, in a pump operating wheel 27 which has thereon a resilient tread or tire 28. The fluid is forced from the pump into a rubber or plastic material outlet tube 29, the inner end of which tube is connected by a coupling 31 to the wall of the pump, and there is an inner nipple 32 to which is attached the outlet end 33 of the pump 20. Suitable wire clips K are positioned about the nipples 19 and 32 to maintain the ends of the pump securely about these nipples. The other end of the tube 29 is suitably attached by means of a coupling 34 to one end of an elongated spray bar 35, the other end of which spray bar is closed, and which spray bar 35, as clearly shown in FIG. 7, has suitable discharge nozzles 36 therein with a downwardly and outwardly extending outlet 37 in each nozzle and which effects the fanning out of the material that is discharged from the spray bar under pressure from the pump P.

Attention is directed to FIG. 8 which is taken along the line 8—8 of FIG. 7, and wherein is disclosed the shape of the opening 38 which results in the fanning out of the sprayed material as seen by the broken lines in FIG. 3.

There are a pair of similarly formed clamp means 39, each having a curved portion 40 thereof which extends about the opposite leg portions H' of the handle H, and these curved portions are maintained in their position by a suitable bolt 41 and the respective extreme end portions of the legs of the handle H are bolted as at 42 to spaced brackets on opposite sides of the mower. The component part 39' of each clamp means 39 extends upwardly and has a hollow boss 43 extending outwardly therefrom and each of these bosses has a set screw 44 therein which secures the same to a transversely extending elongated rocker shaft 45, the end portions of which shaft 45 extend through lock nut 46 having a set screw 47 and an opening 39a in component part 39' of clamp 39, and also through openings in the oppositely disposed bosses 43 each having a set screw 43', and which shaft has a free end 48. The other end of shaft 45 has a depending rocker arm 49 and its welded extension 49' connected with the pump casing P has an opening 50 therein and through which opening there extends the substantially right angled end 51 secured by nut or the like 52 in the said opening of an operating rod 53 for moving the pump actuating wheel 27 into and out of engagement with one adjacent rear wheel W'. At the upper end of this rod there is a right angled portion 54 and an opening in the right angled portion for a cotter pin 55 to be passed through when that right angled portion has been entered into and through opening 56 in a handle 57 and which handle is an elongated bar and has another opening 58 therein adjacent one end, and adjacent the other end there is a laterally extending handle stop pin 59. About the handle H adjacent its upper end, there is a clamp, generally denoted at 60, which clamp is of two parts and is elongated and includes similarly formed semi-circular channels 61 and the lower part of the clamp having outwardly extending flanges 62 and 63 and the upper part of the clamp 64 having similar complemental flanges 65 and 66, and the flange 66 terminating in an upstanding handle mounting support 67 with an opening 68 therein, and with the aforesaid flanges each having openings 69 in the upper part of the clamp which register with openings 70 in the lower part of the clamp. The clamp 60 and its two component parts are placed about the handle and by suitable bolts 71 which pass through registered openings 69 and 70 serve to fix this clamp on the mower handle. The handle 57 has the right angled portion 54 of the operating rod passed through the opening 56 therein, and this handle 57 has a rivet or the like passed through the opening 58 therein and in registry with the opening 68 in the handle mounting support and allowing for pivotal movement of the handle 57. It will thus be seen that, when the handle 57 is in the full line position as shown in FIG. 6, the wheel 27 and its tire 28 are in disengagement with the mower wheel W'. When the handle 57 is moved from the full line position to the dotted line position 57' in FIG. 6, the wheel 27 and the pump P will be moved into the operating position where the tire of the wheel will be in engagement with the rear wheel W' of the mower as clearly seen in FIGS. 1 and 3.

There is a suitable brace bar 72 that is attached to the frame F for the supply tank or container T by means of rivets, bolts or the like 73, and at its other end this brace bar is fixed by means of bolts, welding or the like 74 to one leg of the handle H, and thus rigidity is imparted by means of the mounting of the ends of the handle as at 42 and by means of the brace.

Preferably on the side of the frame F, there is welded or otherwise secured a pair of opposed C-shaped brackets 75 having right angled top and bottom portions 76 and 77 respectively, and in the lower right angled portion there is a clamping means 78 in each bracket. There are a pair of spray bar supporting rods 79 and 80, the ends of which pass through openings, not shown, in the right angled flanges of the C-clamps, and these rods are maintained in vertically adjusted position by means of the screw threaded clamping means 78. Adjacent the ends of each rod 79 and 80, there is a similarly formed resilient spray bar holding clamping means 81. This clamping means is substantially U-shaped and resilient and has two recesses 82 and 83 for disposition and holding therein of the spray bar 35, whereby this spray bar may be placed in either the recess 82 to space the spray bar further away from the periphery of the rear wheels W', or closer to these wheels if the spray bar is placed in the recess 83.

From the foregoing description of the invention as depicted in FIGS. 1 through 6 of the drawings, it will be readily apparent that there is a commercially feasible, practical light-weight spraying attachment for self-propelled or hand pushed mowers, and there is included novel pump means common to the self-propelled or hand pushed mowers as well as the riding type mowers mentioned herein, and the pump being in a novel association with an adjustable spray bar, along with other novel component means.

Description of novel spray means associated with riding tractor type mowers

Figure 10:
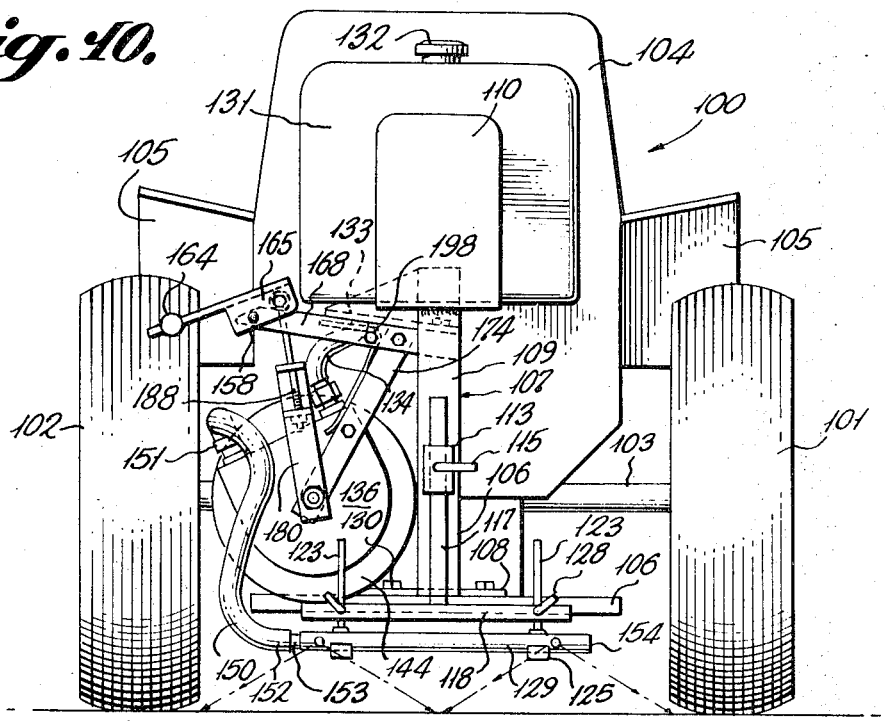
FIG. 10 is a rear elevational view of a modified form of the invention as applied to the draw bar structure of a riding tractor type lawn mower, and with the pump and wheel means in an inoperative position.
Figure 11:
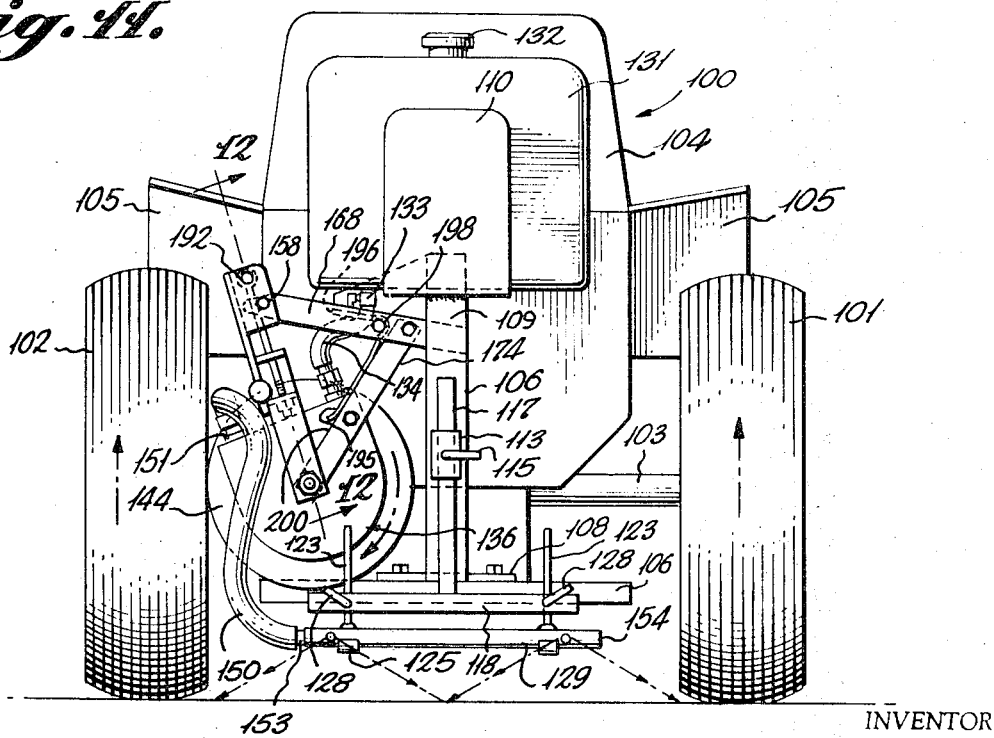
FIG. 11 is also a rear elevational view of the modified form of the invention, wherein the wheel structure and pump have been moved from the position in FIG. 10 to that of FIG. 11, and with the wheel in engagement with the side of an adjacent rear tire of a tractor for operating the pump.

In FIGS. 10 and 11, there are disclosed respectively, rear elevational views of a riding tractor type mower 100. This is a conventional riding type mower, such as a "Toro," "Jacobson" or "Lawn Boy," and others, and, of course, includes four wheels and two of such rear wheels 101 and 102 are shown mounted on rear axle 103 in back of the seat 104 of the mower and the fenders 105, and all of which components are conventional.

Most riding type mowers have associated therewith what is known as a draw bar 106. There is a combined fluid container and adjustable spray bar support generally indicated at 107 in FIG. 13. This said combined support 107 includes a right angled mounting plate 108 at its bottom, with an upstanding substantially flat standard 109 which has welded thereto a U-shaped container support and holder 110 and depending from one side of this container support there is a right angled bracket 111 with suitable spaced openings 112 therein. On the flat standard 109, there is fixed, as by welding, a suitable guide 113 having an internally threaded opening 114 therein into which is a threaded clamp screw 115. This guide has an opening 116 completely therethrough and through which opening a shaft 117 extends and is adjustably positioned in the guide by means of the screw clamp means 115, and at the other end of the shaft 117, there is an elongated transversely extending spray bar support 118 which has an opening 119 completely therethrough from its top surface 120, and another opening 121 in its front surface 122, and these openings are adjacent each end of this spray bar support 118. There is an upwardly extending rod 123 from one end 124 of the U-shaped spray bar clamping and adjusting means 125, and which attaching means has two concave portions 126 and 127 therein for a purpose later described. Each of the rods 123 extends through the openings adjacent the ends of the spray bar support 118 and the rods are held in adjusted position by the screw clamping means 128, and thus a vertical adjustment provided for the U-shaped clamps which support therein a spray bar 129, and this spray bar may be positioned for lateral adjustment either in recesses 126 or 127 as desired, and for vertical adjustment by simply moving the rods 123 in their respective openings 119. Moreover, when the shaft 117 is adjusted in the guide 113, the U-shaped clamps 125 and the spray bar may all be bodily moved simultaneously.

The right angled portion 108 of the container and spray bar support means is bolted by suitable bolts 130 extending through the openings 108' or 108 into the draw bar 106.

Figure 12:
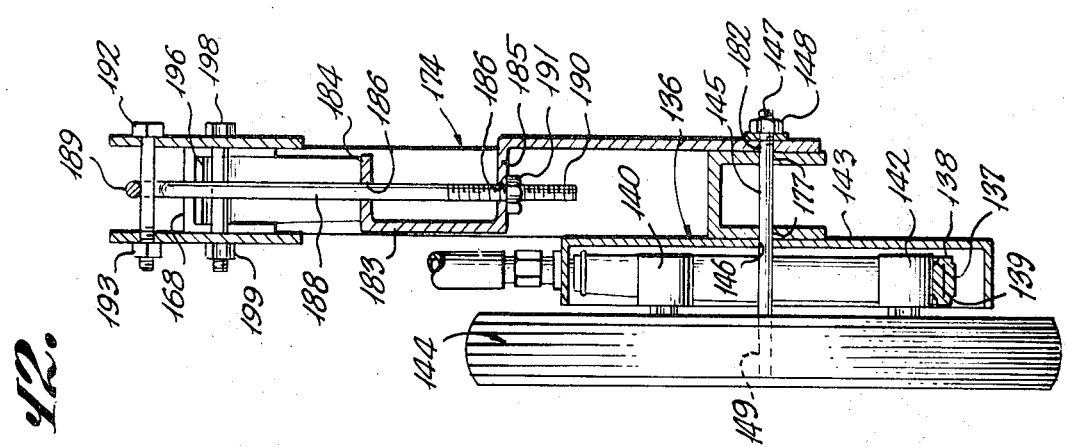
FIG. 12 is a view taken along the lines 12—12 of FIG. 11, looking in the direction of the arrows.

The U-shaped container support and holder 110 has mounted therein a suitable container 131 having a cap screw closure 132 for filling the fluid thereinto. The container, by means of a suitable coupling 133 is connected by means of a flexible hose 134 by means of a coupling 135 to the pump 136. This pump 136 is identical in structure with the pump P in FIGS. 1 to 6 of the drawings, and includes the rubber or plastic tubing 137 which has the central circular opening, not shown, and the oppositely disposed reinforcing ribs 138 and 139, and in the flattened condition as seen in FIG. 12, intermittently compressed by the triangularly arranged rollers 140, 141 and 142, see FIG. 13. These rollers extend into the pump casing 143 engage the pump within the pump casing 136. There is a wheel 144 with a tire similar to the wheel 27 and tire 28, FIG. 5 of the drawings, that is mounted on a shaft 145, which shaft extends through an opening 146 in the pump casing 136, and the end of that shaft is externally screw threaded 147 to receive a retaining nut 148 thereon. The shaft 145 extends through an opening 149 in the roller and wheel structure 144 and allows the wheel 144 to rotate when this wheel is moved into engagement with the inner side of an adjacent rear tire of the tractor for rotating the wheel 144 and consequently the rollers 140, 141 and 142 to operate the pump 137.

There is a resilient and flexible rubber or plastic tube 150, one end of which is connected by means of a coupling 151 to the outlet end of the pump 136. This flexible tube 150 has its other end 152 connected by a suitable coupling 153 to an inlet end of the hollow spray bar 129 and the other end 154 of that bar being closed.

Figure 13:
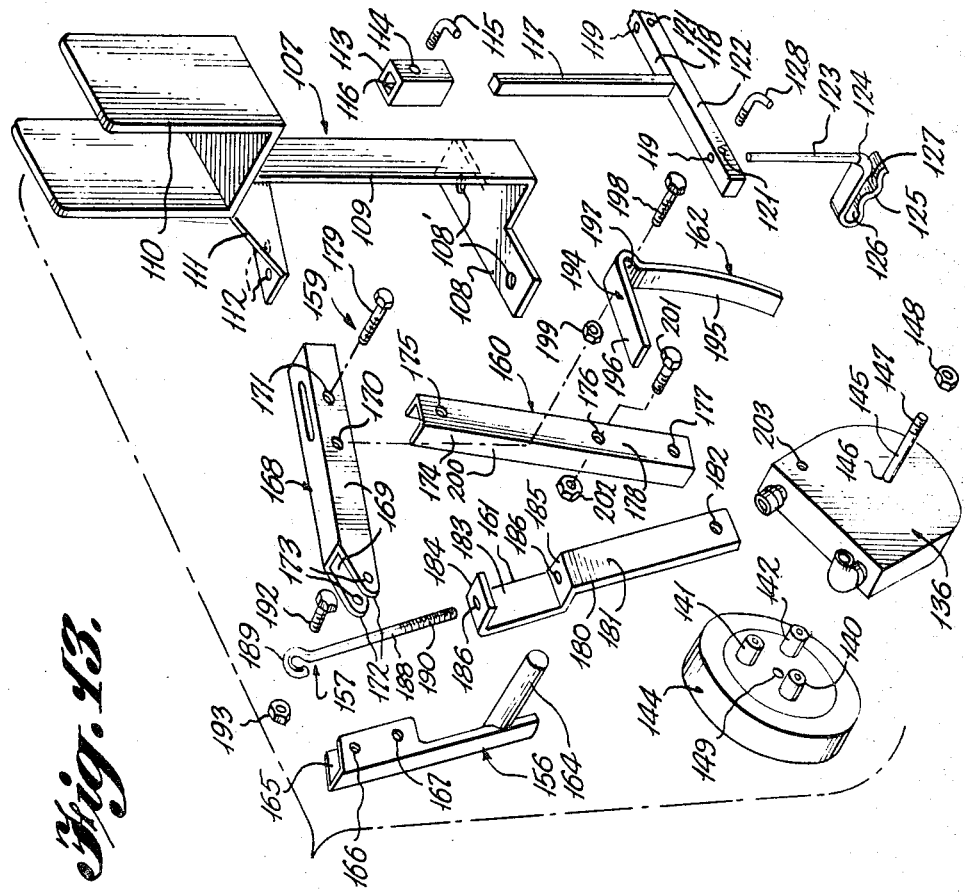
FIG. 13 is an exploded view of the component parts of the linkage structure and the support for the container for the fluid and the pump means and the adjustment means for the spray bar.

The linkage mechanism for effecting swinging movement of the pump 136 and the wheel 144 carried thereby to either place this wheel in contact with the adjacent side of the tractor or withdraw it therefrom is comprised of the components in FIG. 13, generally indicated 156, 157, 158, 159, 160, 161, 162 and 163.

The component 156 is a hand operated lever having a hand grip portion 164 extending laterally therefrom adjacent one end and the other end thereof 165 being U-shaped and with the flanges of the U-shaped portion having therein an opening 166 and another pivot opening 167. Fitted within the U-shaped end 165 of the hand operated lever 156 is an elongated U-shaped link 168 having similarly depending flanges 169, and in these opposite flanges there are registered openings 170 and 171. The forward portion of the link 168 is inclined and provides oppositely spaced similar ears 172, each of which ears has an opening 173 therein in registry with one another. This inclined end portion of the link 168 is positioned in the U-shaped end of the lever 156 and a bolt 158 is passed through the aligned openings 167 and the aligned openings 173 in the end of this lever and forms a pivot for the hand lever 156. There is a channel-shaped standard 174 having spaced openings 175, 176 and 177 in the base 178 thereof. The opening 177 of the standard 174 is positioned over the extended end 147 of the shaft 145 and extends upwardly and has its opening 175 in registry with the opening 171 in the link 168 and is secured thereto by means of a bolt 179, and a nut for the other end of the bolt to secure the standard to the link 168.

Also on the shaft 145, there is positioned an adjustable tension bracket 180, which has a depending flat extension portion 181, with an opening 182 therein and a C-shaped end portion 183, with right angularly extending portions 184 and 185, and in each of which right angular portions there is an opening 186 and these openings are in registry. This bracket 180 has its lower portion positioned on the shaft by means of the opening 182, and this bracket and the standard 174 are both held on the shaft by means of a nut 148. An elongated eye bolt 188 having an eye formation 189 at one end thereof and screw threaded at 190 at the other end is positioned in the openings in the right angled portions 184 and 185 in the bracket 180 and is adjustably held therein by means of a nut 191 applied to the screw threaded end 190 of the eye bolt 188. A bolt 192 extends through openings 166 in the hand lever means 156 and through the eye portion of the bolt 189, and this bolt is secured by a nut 193. There is a substantially right angularly fashioned spring 194 having an inwardly curved downwardly extending leg 195 and an upper substantially flat portion 196 and a recessed portion 197. The flat portion 196 of this spring is positioned in the U-shaped link 168 and there is a bolt 198 that extends through the registered openings 170 in the link 168 and through the recess 197 in this spring element to maintain it in that relationship, and a nut 199 secures the bolt in position on the opposite flange of the link 168.

The depending curved portion 195 of the spring element 194 constantly engages the flat surface 200 of the standard 174 and thus tends to spring load the linkage system of most of the components in FIG. 13. This standard 174 is also bolted by means of a bolt 201 and securing nut 202 by means of an opening 203 in the pump casing 136, and this bolt extends through the opening 176 in the standard 174, thus connecting the pump casing and the standard together as a unit.

From the linkage as so combined and arranged as described hereinbefore and which linkage is shown in detail in FIG. 13, it will be seen, from examining FIGS. 10 and 11, that the wheel 144 and the pump 136 and the handle in the position shown in FIG. 10 are in the inoperative position for the functioning of the pump; however, when the lever 156 of the hand grip portion 164 is moved from the position in FIG. 10 to the position in FIG. 11, the wheel with the pump is shifted by the lever mechanism to a position whereby this wheel 144 is in engagement with a side portion of the rear tire 102 of the tractor, and thus the pump mechanism within the casing is brought into operation, and the fluid from the container 131 through the flexible resilient pipe 134 is entered into the pump structure and the pump structure is brought into operation by the rotation of the rollers 140, 141 and 142 compressing the pump and forcing the fluid outwardly therefrom into the tube 150, which said tube is connected at its free end to the spray bar 129 which has spray nozzles thereon such as in FIG. 3 of the drawings, and consequently the fluid is sprayed in the fan-like arrangement shown in FIGS. 10 and 11 as denoted by the broken lines in FIG. 10.

It is to be understood that when the word "fluid" is used herein, it also means to include liquids, such as fertilizers, insecticides, etc. Further, it is to be recognized that there are common features, particularly the novel pump structure and the means carried by the pump structure, such as a wheel or the like that engages a moving or rotating part of either type mower, hand type or riding type, for supplying the power which may be the side of a driven wheel of the riding mower or the driven rear wheel of the hand pushed type mower, or the power can be taken off from one of the rear moving wheels where the hand type mower is not self-propelled.

By referring to FIGS. 10 and 11, it will be noted that the pivotal axis of 160 and 161 is at the end of the shaft 145, and when the handle 156 in the linkage system is moved from the position shown in FIG. 10 to the downward position as in FIG. 11, this handle 156 and 161 will be off-center of the axis of the shaft 145, and thus the linkage system in the position in FIG. 11 will be locked in a toggle-like arrangement with the wheel in engagement with the inside of the tire for operating the pump.

This invention may be embodied in several forms without departing from the spirit or essential characteristics thereof and the present embodiment is therefore illustrative and not restrictive.

What is claimed is:

1. A spraying unit for attachment to a lawn mower having a plurality of wheels, means carried by the spraying unit for attaching the same to the mower, a container for liquid to be sprayed, a pump, means connected with the container and to the pump for supplying liquid from the container to the pump, spraying means connected with the pump for receiving liquid therefrom, means for supporting the spraying means on the unit, means mounted on the pump and operatively connected therewith for operating the pump, said pump and the means mounted thereon being movable as a unit for operative association with a powered moving means of the mower thus operating the pump to supply said liquid to the spraying means, and means operatively connected with and for moving the pump and said means mounted on the pump.

2. The spraying unit as defined in and by claim 1, wherein means is carried by the unit to support the container for the liquid, and the means connected with the container and to the pump for supplying the liquid from the container to the pump is a flexible conduit.

3. The spraying unit as defined in and by claim 1, wherein the means that is operatively connected with and utilized for moving the pump and the means connected with the pump is a manually operated means carried by the unit.

4. The spraying unit as defined in and by claim 3, wherein the manually operated means is a link connection with the pump and a rod means attached to the link and hand gripping means to rock the link for moving the said means connected with the pump.

5. A spraying unit for attachment to a lawn mower having a plurality of wheels, means carried by the spraying unit for attaching the same to the mower, a container for liquid to be sprayed, a pump, means connected with the container and to the pump for supplying liquid from the container to the pump, spraying means connected with the pump for receiving liquid therefrom, means for supporting the spraying means on the unit, means operatively connected with the pump and movable for operative association with a powered moving means of the mower thus operating the pump to supply said liquid to the spraying means, means operatively connected with and for moving the said means connected with the pump, the means that is operatively connected with and utilized for moving the pump and the means connected with the pump comprising a manually operated means carried by the unit, the said means that is operatively connected with and for moving the said means connected with the pump comprising a plurality of operatively connected together links and having a common pivot point and a hand gripping operating means attached to said links and when the hand operating means is moved the links are accordingly moved to move the means operatively connected with the pump into engagement with a wheel of the mower whereby when said wheel is driven the pump is thus operated to force the liquid into a spray bar and spraying the liquid from that bar.

6. The spraying unit as defined in and by claim 5, wherein the mower includes front wheels and rear driven wheels, and the handle and part of the linkage are off-center from the pivotal axis of the links and thus in effect locking the linkage system in its operative position with the means carried by the pump in engagement with a rear driven wheel of the mower.

7. A spraying unit for attachment to a lawn mower having a plurality of wheels, means carried by the spraying unit for attaching the same to the mower, a container for liquid to be sprayed, a pump, means connected with the container and to the pump for supplying liquid from the container to the pump, spraying means connected with the pump for receiving liquid therefrom, means for supporting the spraying means on the unit, means operatively connected with the pump and movable for operative association with a powered moving means of the mower thus operating the pump to supply said liquid to the spraying means, means operatively connected with and for moving the said means connected with the pump, the spraying unit aforesaid comprising an attachment for a self-propelled walking guided type mower, which includes an upstanding U-shaped handle attached to the mower and a clamp adapted to be placed about one arm of the U-shaped handle, and a rod operating handle pivotally mounted on the clamp and having attached thereto off-center of the pivotal axis of the end of an operating rod and the other end of the operating rod being attached to a link, said link being operatively connected with the pump, means carried by the pump for engaging a moving driven part of the mower, and the handle when being swung from one position will move the said rod and the link which results in moving the means carried by the pump engaging a wheel of the mower and thus operating the pump to supply liquid from the container carried by the mower to a spray bar.

8. A spraying unit mounted rearwardly on a walking type mower including front and rear wheels, a motor, said mower driving suitable cutting blades operatively connected therewith, a container support carried by the mower for supporting a container, a liquid container mounted on said support, a pump means, a flexible conduit connecting the pump with the container for supplying liquid to the pump, a vertically and laterally adjustable transversely extending spray bar mounted at the rear of the mower and having spaced nozzles thereon with outlets that each will discharge a plurality of wide fan-shaped formations, a wheel carried by the pump means and movable therewith, means operatively connected with the pump means for moving the same into engagement with an adjacent rear rotating wheel when rotating to operate the pump means and force the liquid from the pump into an outlet conduit of the pump into the spray bar and out through spaced nozzles carried by said bar in wide fan-shaped formations.

9. The spraying unit as defined in and by claim 8, wherein there is a pair of spaced apart C-shaped brackets fixed to the support for the container, the brackets including outstanding upper and lower right angular flanges with registered openings therein, a pair of rods each extending through the registered openings in the brackets and having at their lower ends substantially U-shaped outwardly opening spray bar clamps, the U-shaped clamps comprising upper and lower gripping members, the lower gripping member having at least two concave recesses spaced apart therein whereby the spray bar is adjustable laterally into either one or the other of the recesses of the U-shaped clamps, means carried by the U-shaped clamp members for engaging the rods held thereby whereby the rods are vertically adjustable and thus can move the spray bar to any desired elevation with respect to the surface of the ground on which the mower runs.

10. A spraying unit carried by and mounted on the rear of a riding type tractor mower including front wheels and rear driven wheels and a motor for propelling same, including a support carried by the unit for a container of liquid, a container carried by said support, flexible conduit means connected with the container and to a pump on said unit for supplying liquid from the container to the pump, spray bar means mounted on the rear of the tractor and connected by means of a flexible conduit to the pump for receiving the liquid therefrom, means for supporting the spray bar means for vertical adjustment, means to laterally adjust the spray bar, and the said unit being supported on a draw bar affixed on the rear of the riding mower.

11. A spraying unit attached to the rear end of a riding tractor type mower as defined in and by claim 10, wherein the pump is within a casing having inside and outside walls and is comprised of a flexible resilient collapsible tube, means including a plurality of spaced rollers suitably mounted to effect compression of the tube against the inside wall of the casing, and said last mentioned means being carried by the pump and adapted to be rotated by engaging a rear driven wheel of the mower.

12. The spraying unit as defined in and by claim 10, wherein a spray bar rod guide means is fixed to said means for supporting the spray bar, the spray bar having an upstanding rod which extends completely through the said guide means and thus the spray bar may be raised or lowered to any desired position with respect to the ground surface.

13. The spraying unit as defined in and by claim 12, wherein the spray bar is elongated and has an opening completely therethrough adjacent each end thereof, a U-shaped spray bar clamping means opening outwardly and comprising upper and lower clamping members, the lower member having spaced concave recesses therein, the clamping means each having an upstanding rod that extends through each of the said openings, means carried by the spray bar in contact with each opening for engaging and clamping the rods of the clamp means in any desired vertical position with respect to the ground surface.

References Cited

UNITED STATES PATENTS

| | | | |
|---|---|---|---|
| 2,044,884 | 6/1936 | Keller | 56—26 |
| 2,703,256 | 3/1955 | Mascaro. | |
| 3,266,728 | 8/1966 | Hallberg | 239—156 XR |
| 3,375,644 | 4/1968 | Harper | 56—25.4 |
| 3,401,890 | 9/1968 | Middlesworth | 239—156 XR |

ROBERT PESHOCK, Primary Examiner

U.S. Cl. X.R.

239—157